Feb. 15, 1949.   F. W. GODSEY, JR   2,461,685
TORQUE AND POWER MEASURING DEVICE FOR SHAFTS
Filed April 30, 1945   4 Sheets-Sheet 1
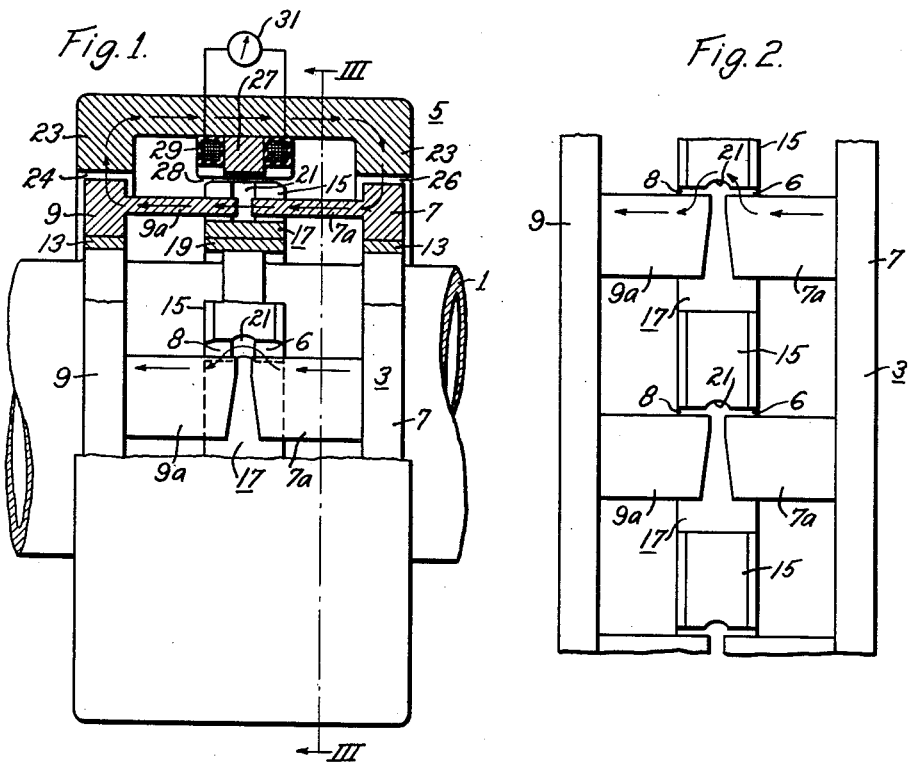
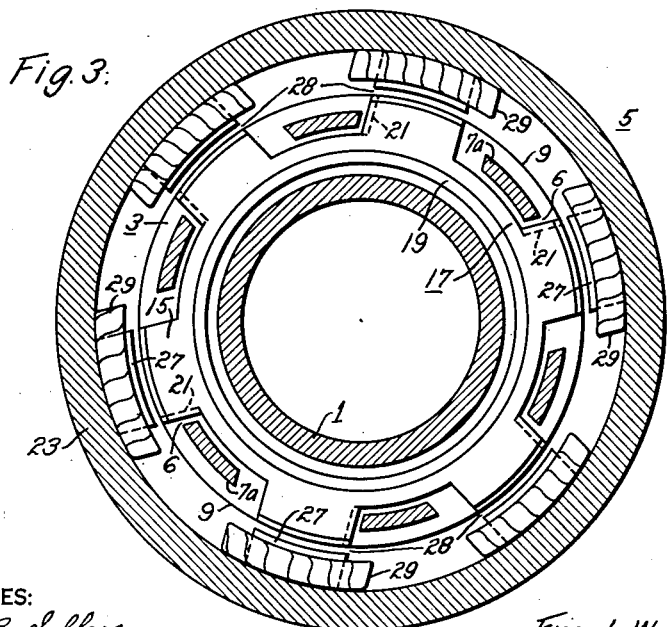
WITNESSES:
Wm. B. Sellers.
E. F. Obertheim
INVENTOR
Frank W. Godsey, Jr.
BY
Paul E. Friedemann
ATTORNEY Feb. 15, 1949. F. W. GODSEY, JR 2,461,685
TORQUE AND POWER MEASURING DEVICE FOR SHAFTS
Filed April 30, 1945  4 Sheets-Sheet 2

WITNESSES:
Wm. B. Sellers.
E. L. Oberheim

INVENTOR
Frank W. Godsey, Jr.
BY
Paul E. Friedemann
ATTORNEY

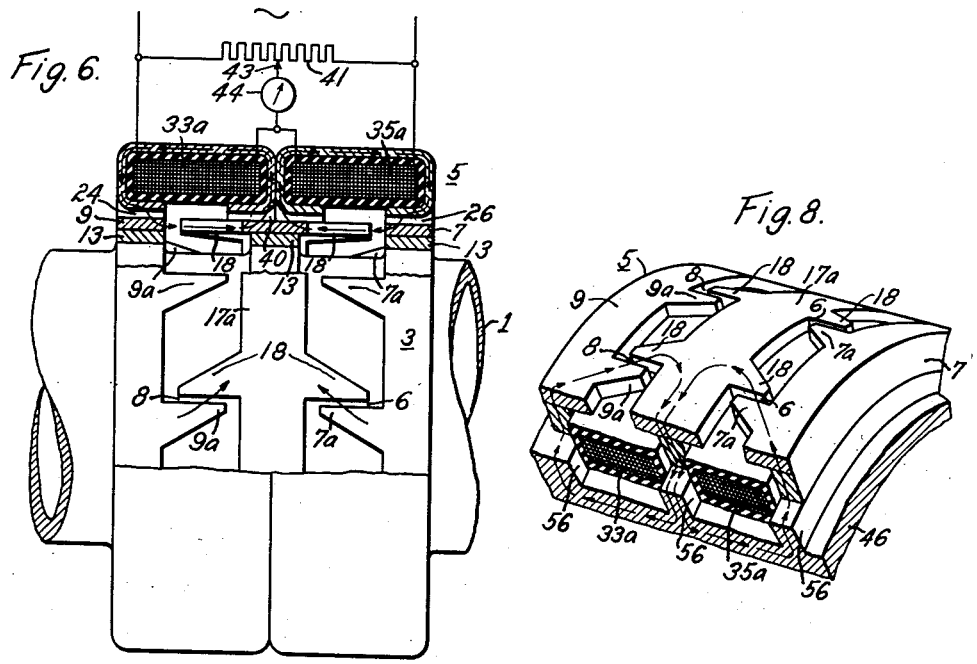
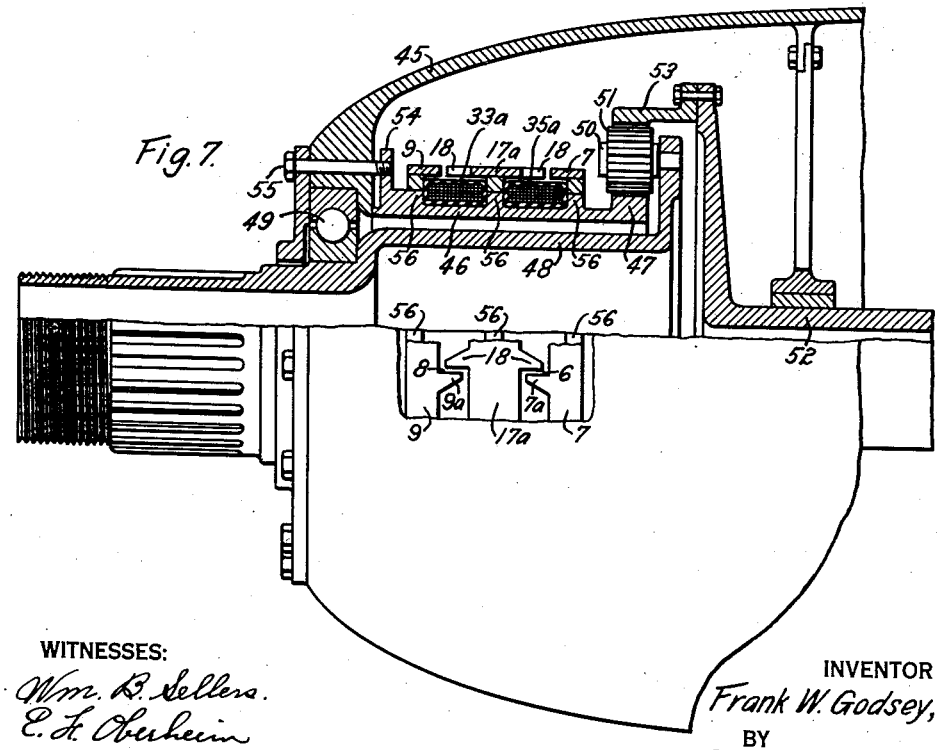

Feb. 15, 1949. F. W. GODSEY, JR 2,461,685
TORQUE AND POWER MEASURING DEVICE FOR SHAFTS
Filed April 30, 1945 4 Sheets-Sheet 4
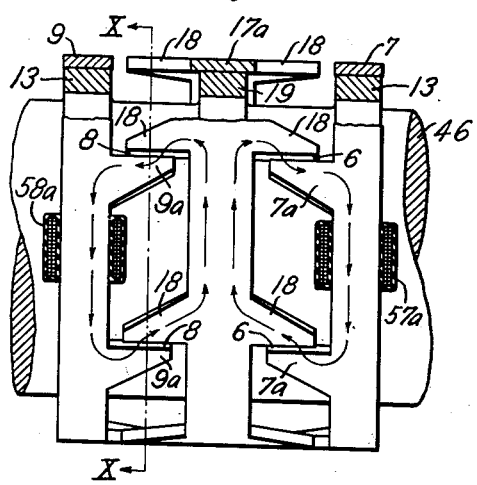
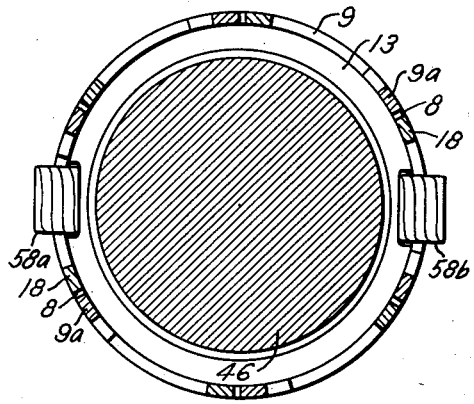
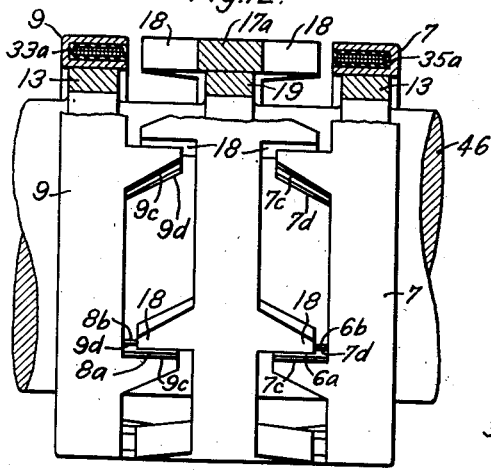
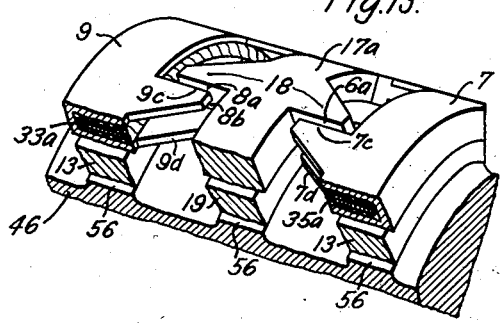
WITNESSES:
Wm. B. Sellers.
E. H. Oberheim
INVENTOR
Frank W. Godsey, Jr.
BY
Paul E. Friedemann
ATTORNEY Patented Feb. 15, 1949

2,461,685

UNITED STATES PATENT OFFICE 2,461,685

TORQUE AND POWER MEASURING DEVICE FOR SHAFTS

Frank W. Godsey, Jr., Pittsburgh, Pa., assignor to Westinghouse Electric Corporation, East Pittsburgh, Pa., a corporation of Pennsylvania Application April 30, 1945, Serial No. 591,045

27 Claims. (Cl. 73—136)

The present invention relates to apparatus responsive to a mechanical characteristic of a member to be stressed for producing indications of certain performance characteristics of such member.

This application is a continuation-in-part of the copending application of F. W. Godsey, Jr., Serial No. 455,258, filed August 18, 1942, entitled Power measuring devices for rotating shafts, now abandoned.

More particularly, the present invention in one embodiment thereof relates to a novel magnetic strain sensitive device combined with an inductor alternator to form a magnetically coupled unit, which is operable in response to a selected strain characteristic of a shaft and the shaft speed to produce an indication of the operating characteristics of the shaft.

In a second embodiment of this invention, an apparatus is provided which utilizes certain of the principles of said first mentioned embodiment to ascertain the elastic deflection of a stressed member.

Numerous efforts have been made in the past to provide suitable devices for indicating or measuring the power transmitted by a rotating shaft without using the conventional dynamometer methods. They have consisted, in part, of the attachment of magnetic strain gauges, optical systems and the attachment of variable capacity electrical condensers on the shaft. Most of these devices operate in the manner of torque meters which measure the torsional deflection of a known gauge length of the shaft transmitting power, which accurately reflects the torque transmitted by the given shaft.

Most of the above schemes require the use of electrical connections to the shaft element by means such as slip rings on the shaft and brushes. However, due to the uncertain electrical characteristics of the slip ring and brush assembly, when the quantity to be measured is small, large errors are introduced into the metering system, thus providing highly unsatisfactory indications of the existing shaft condition.

Efforts directed to overcoming this undesirable condition have led to the development of the inductor generator type of indicators. In this type of device, two inductor generators are displaced from each other along a shaft system. These generators each comprise a toothed rotor secured to rotate with the shaft and an armature member cooperating therewith. The generators are so electrically connected and otherwise arranged that their output voltages are equal and opposed in phase relation when the shaft is rotating without load. Thus, a meter or indicating instrument so connected as to measure the voltage difference of the two generators will show no deflection when the shaft is running at no load. When a load is connected to the shaft rotating at a fixed speed, the shaft undergoes torsional deflection, that is, the shaft twists, and the phase relation of one generator relative to the other is shifted such that a voltage will appear across the terminals of the indicating meter, indicative of this torsional deflection or twist. This condition obtains, however, only through a limited range of phase shift. When the speed also changes the voltages so generated will be proportional to the shaft speed, so that the difference voltage appearing across the indicating meter terminals is proportional to the product of the speed by torque and it is, therefore, possible with a suitably calibrated indicating instrument to read the approximate shaft output directly in horsepower or other convenient unit of measure. While this type of indicator is relatively simple, and for some applications provides a ready means for measuring shaft horsepower, it has the disadvantage of requiring a relatively long gauge length of shaft. Further, it is difficult to construct a generator of this type which is free from the error introducing effects of shaft bending, temperature, end thrust, and calibration errors due to variations in the magnetizing source. Indications are that phase shifts of 5 to 10 electrical degrees will provide quite reliable operation but such phase shifts are possible only on long gauge lengths of shaft, the usual available phase shift being of the order of a fraction of an electrical degree.

It is, therefore, a principal object of this invention to provide an electrical device which is applicable to short gauge lengths of members to be stressed and which is capable of providing an electrical quantity or other electrical or magnetic change of fairly high energy level, accurately representative of the strain of the stressed member.

Another, and equally important object of the present invention is to provide a power measuring device that will respond to the torque and speed characteristics of a shaft and produce an electrical output accurately indicative of the aforenamed characteristics.

Another object of the present invention is to provide a power measuring device for a rotatable shaft that will eliminate the use of slip rings and brushes.

Another object of the present invention is to provide a power measuring device of such mechanical design as to be self-compensating for relative changes of position of the component parts due to temperature effects, end thrust of the shaft, and bending of the shaft, the power output of which is to be measured.

Another object of the present invention is to provide a strain responsive device that will respond to the slight circumferential deflections, that is, twist or torsional deflections, of small gauge-lengths of shafts or other torsionally strained members.

Still another object of the present invention is to provide a power measuring or strain responsive device of compact construction that will be adaptable for use in relatively small spaces.

A further object of this invention is to provide a magnetic strain sensitive device for attachment to a member to be stressed, which for all practical purposes remains magnetically balanced when acted upon by strains in the member other than the strain to be measured and which accurately responds to the strain to be measured.

A still further object of this invention is to provide a magnetic strain measuring device for attachment to a member to be stressed, including electrical impedance means and a variable reluctance magnetic circuit associated therewith, in which the reluctance of said magnetic circuit is varied according to the strain of said member.

Other objects and advantages will become more apparent from a study of the following specification when considered in conjunction with the accompanying drawings, in which:

Figure 1 is a partial sectional view of a type of power measuring device embodying the principles of this invention;

Fig. 2 is a circumferential development showing only the parts that rotate with the shaft;

Fig. 3 is a sectional view taken on the line III—III of Fig. 1;

Fig. 6 illustrates a type of torque measuring device;

Fig. 7 is a sectional view of a torque measuring device installed on a torque loaded stationary member;

Fig. 8 is a perspective view illustrating the invention of Fig. 7;

Fig. 9 is a modification of the invention in Figs. 7 and 8;

Fig. 10 is a sectional view taken on the line X—X of Fig. 9;

Fig. 11 is a diagrammatic showing of the invention in Figs. 9 and 10;

Fig. 12 is a further modification of the invention; and

Fig. 13 is a perspective view showing details of the modification shown in Fig. 12.

Figure 4:
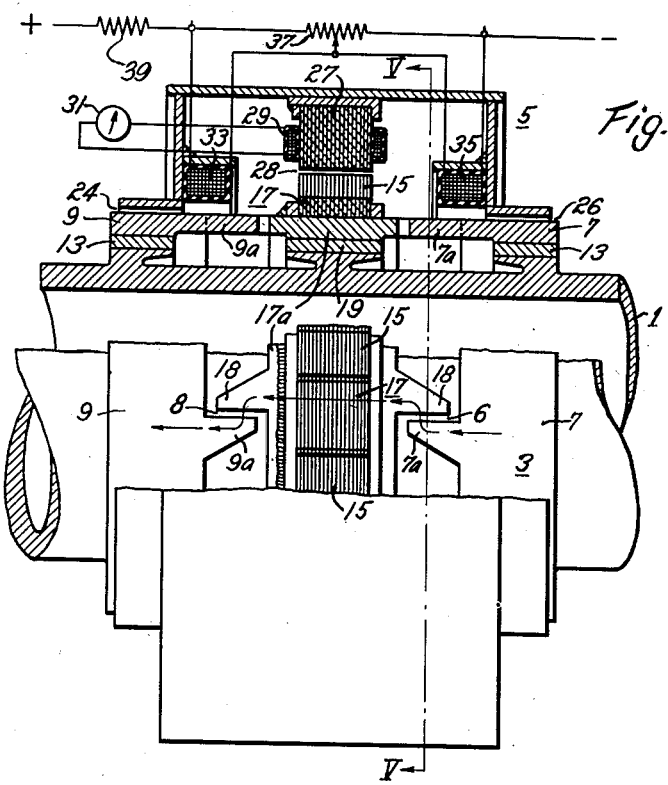
Fig. 4 is a sectional view illustrating a modified form of this invention.

In many cases, it is desirable to have a continuous indication of the power output of a prime mover. This condition is particularly true in the marine and aviation fields. In operating aircraft over long distances, for example, it is mandatory that fuel consumption be as economical as possible. Since every engine has a definite power output range in which the fuel consumption is relatively economical, suitable means for indicating either in terms of torque or power the effort expended in driving the shaft provides means for readily obtaining the desired economical rate of fuel consumption.

The power output of such an engine is, of course, accurately indicated by the elastic torque characteristics and speed of rotation of the engine shaft or shaft system connected thereto. The torque characteristic in this case is the circumferential or torsional deflection of a known gauge length of shaft. With properly designed apparatus, it is possible to utilize this shaft characteristic and the shaft speed to produce an electrical current or voltage indicative of the power output.

Broadly stated, the present invention comprises an alternator or other like machine having a toothed rotor member operating at shaft speed and a magnetic bridge arrangement which is unbalanced by the circumferential or torsional deflections of the shaft due to torque and adapted to divert a portion of the flux circulating in the magnetic bridge through the alternator, thereby generating a voltage in the stationary winding of the alternator indicative of the power output of the shaft.

Referring now to the drawings, there is illustrated in Figs. 1, 2 and 3 a power measuring device embodying the principles of this invention. Numeral 1 designates a shaft, the power output of which is to be measured, numeral 3 indicates a rotor assembly, the various elements of which are secured to rotate with the shaft, and numeral 5 indicates an annular stationary member which is concentrically positioned about the rotor assembly 3. The rotor assembly 3 comprises a pair of axially displaced torque rings 7 and 9 having axially extending finger portions 7a and 9a. These rings are made of magnetic material and are secured to rotate with the shaft 1, the securing connection being through bushings 13 of non-magnetic material, such that the normal circulating magnetic flux in the magnetic flux path will not include the shaft 1 if the shaft is made of steel.

The fingers on each torque ring are equal in number and are conveniently so positioned during assembly that their extremities are in confronting relation, that is, each pair of cooperating fingers lies in the same axial plane. The fingers are in addition positioned in close proximity to faces of teeth 15 on a toothed rotor member 17 also secured to rotate with the shaft on a non-magnetic bushing 19 and positioned intermediate the two rings 7 and 9.

The teeth on the toothed rotor member have each of the faces thereof cooperating with each pair of fingers provided with a radial slot or groove 21, that is, a groove extending from the root of the tooth to its peripheral extremity. In this manner, there are, in effect, two tooth faces formed such that a finger projecting from each torque ring in close proximity to its corresponding tooth face portion will form a magnetic air gap entirely separate from that of the other finger. Thus two circumferential air gaps 6 and 8 are formed (see Fig. 2). As shown in the drawings, each finger extends axially a sufficient distance to overhang the face edge formed by the groove 21; this is for a purpose to be explained more fully hereinafter.

Stationary member 5 in this embodiment of the invention is a magnetic piece. It is provided with radially extending flange-like portions 23 at its axial extremities which encircle the torque rings 7 and 9 of the rotor assembly 3 with a slight air gap therebetween, thus forming circular air gaps 24 and 26 which may, by way of example, be of the order of .005 to 0.100 of an inch. Centrally of stationary member 5 are a plurality of inwardly extending tooth portions 27 having windings 29 in proper series or parallel circuit relation (the series circuit being shown) wound about each tooth, the assembly completely encircling the toothed rotor member 17. It may now, therefore, be seen that an alternator is formed in this construction, in which the toothed rotor member 17 thereof performs the functions of a field structure and is driven at shaft speed; and upon a suitable magnetic flux flow between the alternator stator 27 and the field structure 17, a voltage will be generated in the winding 29, proportional in magnitude to the product of the magnetic flux and shaft speed.

Fig. 2 shows a circumferential development of the rotor assembly 3. It is here clearly illustrated that the teeth 15 on the toothed rotor member 17 are regularly spaced and that the fingers 7a and 9a projecting from the torque rings 7 and 9 are positioned in close proximity to the teeth of the toothed rotor member, the order of separation being, for example, but a few thousandths of an inch. It should be noted at this point that if circumferential distortion of the shaft occurs and if power is being transmitted in a clockwise direction from left to right of the shaft, the air gap 8 will increase while the air gap 6 will decrease. A practical example illustrating the magnitude of such movements is as follows. In some aircraft engines with a hollow shaft of 4 to 7 inches in diameter, a circumferential distortion of approximately .001 of an inch is obtainable in a one inch gauge length of shaft for full load conditions. If the air gaps 6 and 8 are of the order of .005 of an inch with no load, then a total magnetic unbalance of 20% is available in a 1 inch gauge length.

Referring to Fig. 1, the left torque ring 9 may be a permanent magnet so magnetized as to cause the flow of the magnetic flux in a clockwise direction as indicated by the arrows. The other torque ring 7 is similarly magnetized to aid the flow of flux introduced by ring 9. The magnetic circuit includes the stationary member 5, air gap 26, torque ring 7 and finger portion 7a thereof, air gap 6 (see Fig. 2), a tooth 15 of rotor member 17, air gap 8, finger portion 9a, torque ring 9 and air gap 24 to the stationary member 5. Magnetizations of the torque rings 7 and 9 are so adjusted, and air gaps are so adjusted that flux flow around the indicated magnetic circuit is clockwise and the magnetic induction appearing across the air gap 24 is equal and opposite to that appearing across the air gap 26. Likewise, the induction appearing across the air gap 6 is equal and opposite to that appearing across air gap 8. Under no load conditions, a magnetic bridge circuit is obtained in a balanced state and no flux flows across the air gaps 28 between the toothed rotor member 17 and the tooth portions 27 of the stator member 5 cooperating therewith. It may now be seen that if the shaft is running at no load, the magnetic circuit will remain unchanged and the flux will follow the path indicated by the arrows. Therefore, no voltage will be generated in the windings 29. If, however, there is circumferential or torsional deflection of the shaft due to the transmission of torque and if air gap 8 should increase as air gap 6 decreases, the balanced magnetic bridge will no longer exist and a magnetizing force very closely proportional to the bridge unbalance will appear across the air gap 28 causing a flux to flow in the tooth portions 27. A voltage will, therefore, be generated in the winding 29 proportional to the product of the shaft speed and the amount of the unbalanced flux. This voltage may then be metered by any suitable type of indicating instrument 31 such as a standard alternating-current meter, either rectifier or other type, which is shown connected across the terminals of the winding 29 and which may be placed at any convenient location within a reasonable distance from the power measuring device on the shaft.

It will be noted in Figs. 1, 2 and 3 that parts are so proportioned that air gaps are obtained by opposing a large magnetic face against a small magnetic face (see air gaps 6, 8, 24, 26 and 28) so that dimensional shifts due to temperature effects, bending of the shaft causing radial displacement of the fingers 7a and 9a and end thrust causing axial movement of the fingers relative to the alternator rotor teeth 15 may produce only second order changes in the characteristics of the air gaps. This principle is carried out even in the construction of the toothed rotor member 17 which is radially grooved as indicated at 21. As previously mentioned, the fingers 7a and 9a overhang the edges of the groove. In addition, the radial depth of the teeth 15 of the rotor 17 is considerably greater than the radial depth of the fingers 7a and 9a. In this manner, radial movement of the fingers caused by bending of the shaft will not materially vary the confronting face areas of air gaps 6 and 8 nor will end thrust of the shaft causing axial movement of the fingers relative to the toothed rotor member 17 vary such face area. Axial shift of the shaft and rotor assembly relative to the stationary member 5 will not vary the confronting face areas forming the air gaps 24, 26 and 28 since with respect to the air gaps 24 and 26, the axial face length of the flange 23 of stationary member 5 is greater than that of the torque rings 7 and 9. Also, the axial length of the peripheral faces of the teeth of toothed rotor member 17 is greater than that of the inwardly extending tooth portions 27 comprising the stator member 5 of the alternator. Temperature effects are compensated for by providing two air gaps of the construction shown. Increasing or decreasing temperatures will correspondingly vary both air gaps, thus maintaining a balanced bridge. Sloppy bearing fits and vibration will not effect operation of the device as long as transverse movements of the shaft are small compared to the dimensions of the air gaps 24 and 26. In order to produce an unbalance of the magnetic bridge and, therefore, cause a voltage to appear across the indicating meter, it is necessary that the air gap 6 either increase or decrease relative to the air gap 8. If both air gaps 6 and 8 increase or decrease together, as they may under temperature variations and some vibration conditions, the magnetic bridge remains substantially balanced.

The stationary member 5, if desired, may be used as the permanent magnet part of the magnetic circuit instead of the rotor elements or torque rings 7 and 9. Thus, one flange portion thereon would be a north pole and the other flange portion a south pole such that a magnetic flux path similar to that induced by the torque rings will be obtained.

In some cases, it may not be desirable to depend upon permanent magnets for magnetic induction and coils may be introduced as shown in the modified form of the invention illustrated in Fig. 4. Fig. 4 is exactly the same as Fig. 1, in principle, except that torque rings 7 and 9 will not be permanent magnets. Magnetic induction is obtained through the use of coils 33 and 35 which are preferably energized by a suitable direct-current source, although alternating current may also be used. The coils 33 and 35 are connected together with a potentiometer 37 to form a conventional bridge circuit. This bridge circuit may be balanced by adjusting the potentiometer slider to obtain a balance of the current flowing through the coils. Thus, if the coils are identical, the desired balanced magnetic induction condition in the magnetic bridge is obtained when the shaft is supplying no power. The coils are preferably connected to the source of direct current power through a current regulating ballast resistor 39 to remove magnetization errors from the power output meter reading.

Figure 5:
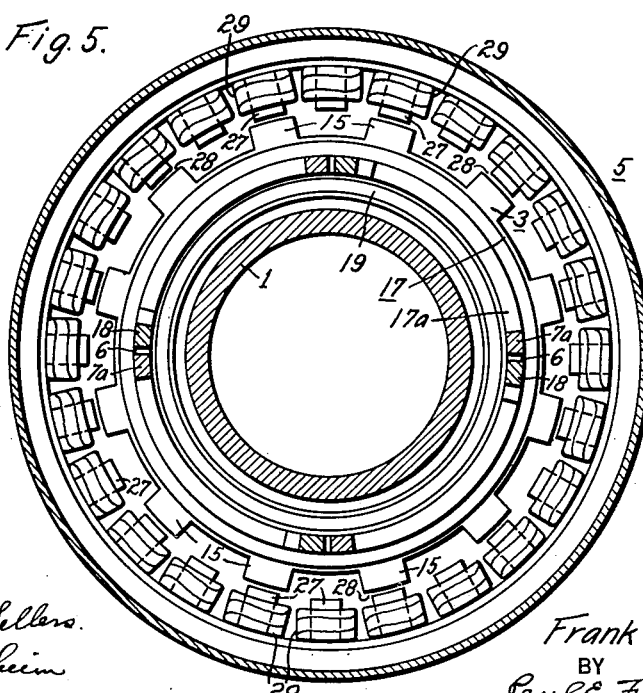
Fig. 5 is a sectional view taken on the line V—V of Fig. 4.

There are numerous differences in structural details of the invention illustrated in Figs. 4 and 5 over that of Figs. 1, 2 and 3. However, as mentioned above, the fundamental principles are unchanged. As illustrated, the rotor assembly 3 is mounted upon non-magnetic rings 13 and 19 which seat upon shaft flanges. Since, with such a shaft design the shaft deflection is largely confined to the shaft areas between the shaft flanges, secure seating surfaces for the shaft ring elements are provided and as a consequence these elements are less likely to shift or change relative position which would upset the calibration of the device. The torque rings 7 and 9 again carry teeth or fingers 7a and 9a. These teeth axially overlap and interlock in close proximity with the teeth 18 extending from opposite sides of the central reference ring 17a. Thus circumferential airgaps 6 and 8 are again formed. The alternator rotor comprises a laminated assembly of rotor punchings which are carried upon the reference element. This punching assembly is conventionally secured between the integral flange on the reference element 17a and the ring which is pressed firmly against the assembly and welded or otherwise secured to the reference element.

The stator assembly housing is fabricated of sheet metal or tubing, whichever is convenient. Centrally secured of the stator assembly is the alternator stator. This also is made of a lamination of punchings and as shown in Fig. 5 is provided with twice the number of poles as the stator. Each pole carries a winding and the windings may be electrically connected in any suitable manner. The magnetic circuit includes the fabricated stator housing, the circular airgap 26, the torque ring 7, the fingers 7a projecting therefrom, circumferential airgaps 6 to fingers 18 and the reference ring or element 17a, thence through the other or opposite set of fingers 18 across circumferential airgaps 8 to fingers 9a and reference ring 9 and the circuit is completed across circular airgap 24 to the fabricated stationary housing. The leg of the magnetic circuit through which the unbalanced magnetic flux flows includes the alternator rotor 15 secured to the reference ring 17a, the airgaps 28 between the alternator rotor and stator and the alternator. As in the embodiment of Figs. 1, 2 and 3, the magnetic circuit is so arranged that for zero shaft torque the magnetic flux flows in that portion of the magnetic circuit first traced. The magnetic circuit is essentially a magnetic bridge circuit. The circumferential airgaps 6 and 8 are varied in an opposite sense upon twisting of the shaft. Thus the magnetic bridge which is formed by the stator and rotor assembly and which for zero torque is normally in a magnetically balanced condition, is unbalanced and a magnetic flux very nearly proportional to the shaft twist or torque flows through the alternator. The resulting voltage generated is dependent upon the flux density and speed of rotation of the alternator rotor, which in view of the torque proportional flux density in the alternator, is proportional to shaft power.

This power indicator provides a means for conveniently and accurately indicating the horsepower being transmitted by a rotating shaft. The inventive combination of a magnetic bridge structure unbalanced by torque applications to a shaft for supplying a magnetic flux to an alternator with all electrical windings on the stationary member eliminates errors due to slip ring and brush electrical characteristics and also eliminates the need for a relatively long gauge length of shaft for obtaining the necessary magnitude of circumferential or torsional deflection.

It is possible to utilize the shaft strain sensitive elements of the hereinbefore described power measuring device in an apparatus adapted to measure shaft strain only. Such an arrangement is shown in Fig. 6 of the drawings. Devices of this type are disclosed in the copending application of B. F. Langer and F. W. Godsey, Jr., Serial No. 458,378, filed September 15, 1942, and entitled Torque measuring devices for shafts, which matured on January 18, 1949, into Patent 2,459,171.

Another arrangement for measuring shaft strain is disclosed in Patent 2,349,653, issued to Frank W. Godsey, Jr., the inventor in this application and entitled Thrust measuring device for shafts.

The assembly in Fig. 6 also comprises generally a rotor assembly 3 and a stator member 5; however, there is no generating action upon relative rotational movement of the stator and rotor as in the case of Figs. 1 and 4, since the stator and rotor are now magnetically coupled across the three circular airgaps 24, 26 and 40. Thus no change in the magnetic flux linking the stator and rotor across these circular airgaps may occur with pure shaft rotation and the only effective magnetic flux change results from the change in relative position of the shaft elements because of shaft strain. To accomplish this function the alternator assembly of Figs. 1 and 4 is completely eliminated. The rotor assembly now includes a reference ring 17a having a smooth peripheral surface in place of the alternator rotor. This reference ring is centrally disposed of the torque rings 7 and 9 and is provided with axially extending fingers 18 on each side thereof which interlock the teeth 7a and 9a of the torque rings to form the small circumferential airgaps 6 and 8. As in the case of the power measuring device, when torque is transmitted by the shaft, the airgaps 6 and 8 are varied in an opposite sense.

The stator 5 is formed of annular channels of sheet magnetic material which straddle each coil from opposite sides thereof. This assembly forms a magnetic housing for each coil 33a and 35a and the housings are disposed in abutting relationship as shown to form the complete stator assembly. This stator is concentrically disposed of the rotor assembly 3 to form the circular airgaps 26, 24 and 40. Since the airgaps 26, 24 and 40 are formed between the smooth circular surfaces of the stator and rotor it will be apparent that a generating action may not occur when the rotor is rotated. As a consequence the only measurable flux change which may occur in the magnetic circuit is that which results from a change in the airgaps 6 and 8. The coils 33a and 35a may be connected as shown in adjacent legs of a conventional Wheatstone bridge circuit, the remaining two legs of which are formed by the tapped sections of the potentiometer 41 depending upon the setting of the potentiometer slider 43, to obtain bridge balance at zero shaft torque. The bridge circuit is energized from a suitable source of alternating current indicated by the sinusoidal wave and an indicating instrument 44 calibrated in lb. ft. if desired, is connected across the output terminals of the bridge circuit.

An instantaneous flow of magnetic flux may be as indicated by the arrows in the magnetic circuit. When the shaft is strained in torsion, the airgaps 6 and 8 vary in opposite directions, thus increasing the magnetic flux linked with one coil and decreasing the magnetic flux linked with the other coil, to effect an opposite change in the coil impedances. This unbalances the bridge circuit and produces an indication at the instrument 44 representative of the shaft torque.

While such a device represents a highly desirable solution to the problem of shaft torque in rotatable shafts or shaft system, it is possible to effect a further simplification thereof in installations in which the member to be strained in torsion is permanently restrained from continuous rotation. One such arrangement is shown in Figs. 7 and 8 of the drawings in which the rotor assembly 3 is attached to the reaction or sun gear member of a planetary gear drive in a radial aircraft engine. Only a fragmentary portion of the front housing of such an engine is shown. It includes the stationary gear housing 45 to which the reaction member 46 is secured at one extremity. The other extremity of the reaction member terminates in a gear 47. A propeller shaft 48 is rotatably mounted in ball bearings 49 in the forward end of the gear housing. This shaft extends through the reaction member 46 beyond which it is flanged. Stub shafts 50 equally distributed, circumferentially around the flange on the propeller shaft carry small spur gears 51 which mesh with the sun gear 47 on the reaction member. The forward extremity of the engine crank shaft 52 is journaled in the gear housing 45. Beyond this journal, it is flanged outwardly. An internal ring gear 53 fixed to the engine crank shaft flange extremity meshes with the spur gears 51 carried by the propeller shaft. Thus when the crank shaft is rotated, the spur gears travel about the sun gear on the reaction member and drive the propeller shaft in rotation. As a consequence of this, a torque loading is imposed upon the reaction member which causes a slight circumferential deflection thereof proportional to said torque loading. Thus, it is possible to apply the magnetic elements of the rotor assembly 3 of the hereinbefore described torque sensitive pickup directly to the reaction member where their function is again that of changing the reluctance of the magnetic circuit or more specifically the magnetic reluctance between the torque rings 7 and 9 of the reference ring 17a.

In the specific assembly illustrated in Fig. 7 of the drawings, the flanged extremity 54 of the reaction member is securely bolted by means of the bolts 55 to the gear housing 45. Axially spaced at equal intervals along the reaction member and integral therewith are three rings or flanges 56. These form the predetermined gauge lengths over which the elastic deflection is measured and provide very secure seats upon which to mount the ring elements of the strain sensitive pickup. The torque rings 7 and 9 and the reference ring 17a are securely magnetically bonded to the three shaft rings with the reference ring disposed upon the central ring on the reaction member. The fingers or teeth 18 of the reference ring, interlocked by the fingers or teeth 7a and 9a of the torque rings, form the circumferential airgaps 6 and 8 as before described. A pair of annular magnetizing coils 33a and 35a are disposed in the annular recesses formed between the rings on the reaction member by this assembly. The magnetic circuit includes the reaction member 46, the torque rings 7 and 9, the airgaps 6 and 8 and the reference ring 17a. An instantaneous condition of magnetic flux in the magnetic circuit may be as indicated by the arrows in Fig. 8 which is an enlarged perspective detail of the assembly. Alternatively, the winding turns of the coils 33a and 35a may be so arranged or the phase relation of the energizing currents for the coils so related that the instantaneous fluxes produced by the coils are in the same direction around the magnetic circuit. Thus, an instantaneous flux condition is obtained in the magnetic circuit analogous to that of the flux flow produced by the permanent magnets of Fig. 1 or the coils 33 and 35 of Fig. 4 and the total magnetic flux radially through the central path of the assembly for zero torque on the reaction member in which case the airgaps 6 and 8 are equal, is zero. For the circulation of the magnetic flux indicated in the drawing and also the alternative flux circulation suggested which alternative will be understood in connection with the description of the invention appearing in Figs. 1 through 5, when the reaction member is subjected to torque, the circumferential airgaps 6 and 8 change in dimension in opposite directions to effect opposite proportional changes in coil impedance. This impedance change, or its resulting voltage unbalance may be measured in a conventional impedance bridge circuit as discussed in connection with Fig. 6.

A slightly modified arrangement of the invention shown in Figs. 7 and 8 appears in Figs. 9 and 10 and the diagrammatical equivalent thereof in Fig. 11. With this modified arrangement it is possible to keep the magnetic flux out of the reaction member, that is, keep the magnetic flux entirely within the confines of the two torque rings and the reference ring. This is accomplished in Figs. 9 and 10 by mounting the torque rings 7 and 9 and the reference ring 17a upon non-magnetic rings of bushings such as 13 for the torque rings and 19 for the reference ring. Suitable peripheral recesses are provided in the non-magnetic rings 13 at diametrically opposite points to receive one side of the magnetizing coils 57a, 57b, 58a and 58b which are wound about the torque rings 7 and 9 (see Fig. 11). The coils 57a and 57b are located at diametrically opposite points in the torque ring 7 and the coils 58a and 58b are located at diametrically opposite points on the torque ring 9. The diametrically disposed pairs of coils are each connected as one leg in a conventional bridge circuit across the output terminals of which the meter 44 is connected, (see Fig. 11). The coil turns of the diametrically disposed pairs of coils are so disposed that the fluxes produced by each of the pairs of coils are in opposition in the respective torque rings. An instantaneous flow of magnetic flux may be as indicated by the arrows in Fig. 9. It will be observed that none of the magnetic flux need now link the reaction member. The magnetic circuits are complete in the torque ring and reference ring assembly. When the circumferential airgaps 6 and 8 change in opposite directions with torque application to the reaction member, the impedances of the pairs of coils change in opposite directions. The resulting impedance unbalance of the bridge circuit is indicated by the instrument 44 and represents the torque applied to the reaction member.

The modification of the invention illustrated in Figs. 12 and 13 of the drawings combines certain of the principles of the embodiment of Figs. 7 and 8 and the embodiment of Figs. 9 through 11 in that annular coils about the reaction member are employed as the magnetizing source and the torque and reference ring assembly is so arranged that the magnetic flux may not link the reaction member. This is accomplished by forming the torque rings 7 and 9 of sheet magnetic material or by other machine operation from solid magnetic stock, in the shape of annular members of channel shaped cross section, with the channel sides forming the inner and outer peripheries of the annular members and being of such configuration to form the axially extending teeth 7c, 7d and 9c, 9d, respectively on the inner and outer peripheral channel sides of the torque rings 7 and 9. These torque rings are supported upon non-magnetic bushings 13 on the outer rings 56 which form an integral part of the reaction member. A reference ring 17a secured on the non-magnetic ring 19 on the central integral ring of the reaction member, interlocks the teeth or fingers 18 thereof with the teeth or fingers of the torque rings to form the outer and inner circumferential pair of airgaps 6a and 6b, respectively, between the fingers 7c and 18 and 7d and 18, and to form the pair of circumferential airgaps 8a and 8b, respectively between the fingers 9c and 18 and 9d and 18. The assembly is such that the pairs of airgaps 6a, 6b and 8a, 8b vary in opposite directions when the reaction member is twisted. Annular coils 33a and 35a are disposed in the channel sections respectively of the torque rings 9 and 7. These coils may be connected in a conventional bridge circuit in the manner illustrated in Fig. 6. This arrangement provides a magnetic circuit about the annular coils through the magnetic material of the torque rings and the magnetic circuit is completed across the circumferential airgaps in the reference ring fingers 18. In this embodiment of the invention, as in the previously described embodiments twisting of the reaction member relatively angularly displaces the several rings of the torque sensitive assembly. The pairs of airgaps 6a, 6b and 8a, 8b change in opposite directions and oppositely change the magnetic fluxes linking the coils. The resulting impedance unbalance of the coils is an indication of the torque applied to the reaction member.

It will be noted that the advantages of the rotor construction discussed in connection with the power measuring device are incorporated in all the torque sensitive devices described. Thus, dimensional shifts caused by end thrust of the stressed member, bending thereof, or dimensional shifts with temperature changes are compensated. Specifically, end thrust which causes greater or lesser overlapping of the fingers of the three ring elements depending upon the direction of the thrust causes dimensional shifts in the confronting faces of both sets of airgaps in the same direction. Thus, the coil impedances change in the same direction and bridge balance remains undisturbed. Similarly, shaft bending affects both sets of airgaps in the same direction. Analogous considerations apply to dimension changes caused by temperature variations. The effect of vibration is conveniently eliminated by designing the torque sensitive ring assembly to have a critical frequency well beyond the range of torque pulsations at the crankshaft or gear tooth frequencies. The design problem here is not great because of the simplicity and inherent rigidity of the torque sensitive assembly.

From the foregoing, it is apparent that applicant with his novel magnetic strain sensitive assembly has provided a means for conveniently and accurately determining the strain of a stressed member. The strain sensitive assembly offers a practical solution to the problem of strain measurement in either rotating or stationary shafting. It is inherently simple and rugged which together with its balanced mechanical and magnetic characteristics obviates the pickup of or response to unwanted quantities. The use of such a strain sensitive assembly in conjunction with an alternator to form a magnetically coupled shaft unit in which the strain sensitive elements control the flux circulation or flux density in the alternator offers possibilities of accurate power measurement on shaft installations in a degree hitherto unobtainable.

The foregoing disclosure and the showings made in the drawings are merely illustrative of the principles of this invention and are not to be interpreted in a limiting sense. The only limitations are to be determined from the scope of the appended claims.

I claim as my invention:

1. A shaft power measuring device comprising, in combination, a single stationary electromagnetic unit including an electrical coil, a magnetic circuit of magnetizable material including said stationary electromagnetic unit, means for producing in said magnetic circuit a magnetic flux, said magnetic flux when changing producing voltage in said electrical coil means in an amount corresponding to changes in value of said magnetic flux, means forming a part of said magnetic circuit and responsive to the speed of rotation of the shaft and the circumferential deflection of said shaft for changing the value of said magnetic flux, and means for measuring a voltage in said electrical coil whereby the power output of said shaft is indicated.

2. A shaft power measuring device comprising, in combination, a toothed rotor member secured to rotate with said shaft, a stator member including a winding, a magnetic circuit of magnetizable material including said toothed rotor member and said stator member, means for producing a magnetic flux in said magnetic circuit, said magnetic circuit being constructed so that at zero shaft torque the magnetic flux flowing therein does not link said winding, means forming a part of said magnetic circuit responsive to the torque characteristics of said shaft when transmitting power for diverting a portion of the magnetic flux in said magnetic circuit proportional to said torque characteristics through said winding thereby inducing a voltage in said winding, and means for measuring said voltage whereby the power output of said shaft is indicated.

3. A shaft power measuring device comprising, in combination, a toothed rotor member secured to rotate with said shaft, a stator member including a winding, a magnetic circuit of magnetizable material forming a magnetic bridge structure including said toothed rotor member and said stator member, means for producing a magnetic flux in said magnetic bridge structure, said magnetic bridge structure being normally balanced when said shaft output is zero, means responsive to the torque characteristics of said shaft when transmitting power for unbalancing said magnetic bridge and diverting a portion of the magnetic flux therein proportional to said torque characteristics through said stator member to link said winding thereby inducing a voltage in said winding, and means for measuring said voltage whereby the power output of said shaft is indicated.

4. A shaft power measuring device comprising, in combination, a toothed rotor member secured to rotate with said shaft, a stator member including a winding, a magnetic circuit of magnetizable material forming a magnetic bridge structure including said toothed rotor member and said stator member, means for producing a magnetic flux in said magnetic bridge structure, said magnetic bridge structure being normally balanced when said shaft output is zero, means in said bridge structure operable in response to the torque characteristics of said shaft adapted to unbalance said magnetic bridge and divert a portion of the magnetic flux circulating therein proportional to said torque characteristics through said stator member to link said winding thereby inducing a voltage in said winding, and means for measuring said voltage whereby the power output of said shaft is indicated.

5. A power indicator for a shaft comprising, in combination, a toothed rotor member secured to rotate with said shaft, a stator member including a winding, a magnetic circuit of magnetizable material forming a magnetic bridge structure including said toothed rotor member and said stator member, means for producing a magnetic flux in said magnetic bridge structure, said magnetic bridge structure being normally balanced when said shaft output is zero, ring means included in said magnetic bridge structure axially displaced on said shaft having portions thereon magnetically coupled with said toothed rotor member, said ring means being relatively angularly displaceable in response to the torque characteristics of said shaft to unbalance said magnetic bridge and divert a portion of the magnetic flux circulating therein proportional to said torque characteristics through said stator member to link said winding thereby inducing a voltage in said winding, and means for measuring said voltage whereby the power output of said shaft is indicated.

6. A power indicator for a shaft comprising, in combination, a rotor assembly secured to rotate with said shaft, an annular stationary member concentrically positioned relative to said rotor assembly, a toothed rotor member included in said rotor assembly, a stator member comprising core members having windings thereon secured to said stationary member, a magnetic circuit including said rotor assembly and said stationary member, means for producing a magnetic flux in said magnetic circuit, said magnetic flux normally circulating in said stationary member and said rotor assembly when said shaft output is zero, means included in said rotor assembly operable in response to the torque characteristics of said shaft when transmitting power for diverting a portion of the magnetic flux in said magnetic circuit proportional to said torque characteristics through said stator member to link said windings thereby inducing a voltage in said windings indicative of the torque and speed characteristics, that is power, of said shaft.

7. A power indicator for a shaft comprising, in combination, a rotor assembly secured to rotate with said shaft, an annular stationary member concentrically positioned relative to said rotor assembly, a toothed rotor member included in said rotor assembly, a stator member comprising core members having windings thereon secured to said stationary member, a magnetic circuit including said rotor assembly and said stationary member, means for producing a magnetic flux in said magnetic circuit, said magnetic flux normally circulating in said stationary member and said rotor assembly when said shaft output is zero, a pair of rings forming the axial extremities of said rotor assembly having portions thereon magnetically coupled with said toothed rotor member, said rings being relatively angularly displaceable upon circumferential distortion of said shaft due to torque when said shaft is transmitting power to divert a portion of the magnetic flux in said magnetic flux path proportional to their relative angular displacement through said stator member to link said windings thereby inducing a voltage in said windings indicative of the power output of said shaft.

8. A power indicator for a shaft comprising, in combination, a rotor assembly secured to rotate with said shaft, an annular stationary member concentrically positioned relative to said rotor assembly, a toothed rotor member axially centrally disposed of said rotor assembly, a stator member for said toothed rotor member secured to said annular stationary member, a winding arranged on said stator member, a pair of rings forming the axial extremities of said rotor assembly each having an axially extending finger portion positioned in close proximity to the face of a tooth on said toothed rotor, a magnetic circuit of magnetizable material, means for producing a magnetic flux in said magnetic circuit, said magnetic circuit including said stationary member, one of said rings, a finger portion thereof, the corresponding tooth of said toothed rotor member, the corresponding finger of the other of said rings, through said other ring and back to said stationary member, said rings being relatively angularly displaceable upon circumferential distortion of said shaft, due to torque, when transmitting power to move a finger associated with one of said rings closer to the corresponding tooth face while moving a finger of the other of said rings away from said tooth face thereby diverting a portion of the magnetic flux in said magnetic circuit proportional to such finger movement through said stator member to link said winding and inducing a voltage in said winding indicative of the torque and speed characteristics, that is the power, of said shaft.

9. Apparatus of the character referred to in claim 8 in which the face of a tooth of said toothed rotor member in close proximity to said fingers is provided with a radial groove thus forming a face portion for each of the fingers of said rings, said finger portions overhanging the axial extremities of said face portions such that axial movement of said fingers relative to said toothed rotor member due to compression or tension loading of said shaft will not effectively vary the area of the confronting faces.

10. Apparatus of the character referred to in claim 8 in which the radial depth of the teeth of said toothed rotor member is greater than the radial depth of said finger portions of said rings, said fingers being positioned substantially centrally of the radial depth of said teeth such that radial movements of said fingers relative to said toothed rotor member due to loading of said shaft in bending will not effectively vary the area of the confronting faces.

11. Apparatus of the character referred to in claim 8 in which a circular airgap is formed between the extremities of said rotor assembly and said annular stationary member, the axial face length of one of said members comprising said circular airgap being greater than that of the other, such that axial shift of said rotor assembly relative to said stationary member will not vary the area of the confronting circular faces.

12. A power indicator for a shaft comprising, in combination, a rotor assembly secured to rotate with said shaft, an annular stationary member concentrically positioned relative to said rotor assembly, a toothed rotor member axially centrally disposed of said rotor assembly, a stator member for said toothed rotor member secured to said annular stationary member, a winding arranged on said stator member, a pair of permanent magnet rings forming the axial extremities of said rotor assembly each having an axially extending finger portion positioned in close proximity to a face of a tooth on said toother rotor, a magnetic circuit of magnetizable material, said permanent magnet rings being so magnetized as to induce a flow of magnetic flux in said magnetic circuit, said magnetic circuit including said stationary member, one of said rings, a finger portion thereof, the corresponding tooth of said toothed rotor member, the corresponding finger of the other of said rings, through said other ring and back to said stationary member, said rings being relatively angularly displaceable upon circumferential distortion of said shaft, due to torque, when transmitting power to move a finger associated with one of said rings closer to the corresponding tooth face while moving a finger of the other of said rings away from said tooth face thereby diverting a portion of the magnetic flux in said magnetic circuit proportional to such finger movement through said stator member to link said winding and inducing a voltage in said winding indicative of the torque and speed characteristics, that is the power, of said shaft.

13. Apparatus as set forth in claim 8 in which said means for producing a magnetic flux comprises electrical coil means suitably energized from a current source to induce a flow of flux in said magnetic circuit.

14. In combination, stationary electromagnetic means, a rotor assembly positioned in close proximity thereto, a magnetic circuit of magnetizable material including said electromagnetic means and said rotor assembly, means for producing a magnetic flux in said magnetic circuit, changes in the value of said magnetic flux correspondingly changing the voltage in said electromagnetic means, relatively movable elements included in said rotor assembly for changing the R. M. S. value of said magnetic flux, and means for measuring the voltage in said electromagnetic means whereby the relative movement of said relatively movable elements is indicated.

15. In a magnetic device, the combination of, a stationary member of magnetic material, a rotor member of magnetic material, said rotor member being disposed with respect to said stationary member such that airgaps of constant magnetic characteristic are formed therebetween, means for producing a magnetic flux linking both said members across said airgaps, and a plurality of relatively displaceable elements forming a part of the rotor member and linked by said magnetic flux which when relatively displaced after the R. M. S. value of the magnetic flux linking said members.

16. In a magnetic device, the combination of an annular stationary member of magnetic material, a rotor member of magnetic material concentrically disposed with respect to said annular stationary member such that airgaps of constant magnetic characteristic are formed therebetween, means for producing a magnetic flux linking said members across said airgaps, and at least two relatively displaceable elements, forming a part of the rotor member and linked by said magnetic flux, which when relatively displaced alter the R. M. S. value of the magnetic flux linking said members.

17. In a magnetic device for indicating an operating characteristic of a shaft, the combination of, a stationary member of magnetic material, a rotor member of magnetic material rotated by the shaft, said rotor member having portions thereof so disposed with respect to said stationary member that a plurality of airgaps having constant magnetic characteristics are formed therebetween whether said rotor is rotating or stationary, means for producing a magnetic flux linking said members across said airgaps, and means forming a part of the rotor member responsive to the shaft operating characteristics for altering the distribution of the magnetic flux linkages of said members in an amount indicative of an operating characteristic of the shaft.

18. In a magnetic device for indicating an operating characteristic of a shaft, the combination of, a single stationary member, a single rotor member operated by the shaft, means for producing a magnetic flux linking both said members, at least two relatively displaceable elements forming a part of the rotor member and linked by said magnetic flux, said elements being relatively displaceable upon an elastic deflection of the shaft, whereby the magnetic flux linkages of said members are altered in an amount indicative of an operating characteristic of the shaft.

19. In a magnetic device for indicating an operating characteristic of a shaft, the combination of, a stationary member of magnetic material, a variable reluctance rotor member of magnetic material operated by the shaft, means for producing a magnetic flux linking both said members, the reluctance of said rotor member being varied in an amount proportional to an elastic deflection of said shaft, whereby the flux linkages of said members are altered in an amount proportional to an operating characteristic of said shaft, and means responsive to the magnetic flux whereby an operating characteristic of the shaft is indicated.

20. In a magnetic device for an elastic member subject to torque, the combination of, a magnetic circuit of magnetizable material, a variable reluctance member forming a part of said magnetic circuit, said variable reluctance member comprising a central ring-like element and a ring-like element having axially extending projections axially disposed on each side of the central ring-like element, a plurality of projections on said central ring-like element, disposed in axial overlapping proximity with the projections of the respective ring-like elements located on each side thereof such that small circumferential airgaps are formed therebetween, means supporting all of said ring-like elements on said elastic member so that said elements are relatively angularly displaced upon the application of torque to said elastic member to vary said circumferential airgaps, and coil means associated with said magnetic circuit.

21. In a magnetic device for an elastic supporting member, the combination of, three ring-like members each encompassing said elastic member and disposed in spaced axial relationship, each of said ring-like members having axial projections which overlap and are in proximity with cooperating projections on adjacently disposed ring-like members to form small airgaps between the projections, and coils disposed in the recesses between said ring-like members and encompassing said elastic member.

22. In a magnetic device for an elastic member, the combination of, three ring-like elements, means for non-magnetically securing said ring-like elements to said elastic member in axially spaced relation, means including a plurality of projections extending from each of said ring-like elements which are disposed in interlocking proximity with cooperating projections on adjacent sides of said ring-like elements to form flux paths therebetween, and coil means associated with said flux paths.

23. An electromagnetic device responsive to the power being transmitted by a shaft comprising, in combination, a magnetic bridge circuit, means for producing a magnetic flux in said magnetic bridge circuit, means for unbalancing said magnetic bridge circuit in dependence of the torque of said shaft and producing an unbalanced magnetic flux therein, and an alternator having a rotor operated at a speed depending upon shaft speed and a stator therefor, each disposed in said magnetic bridge circuit to be linked by said unbalanced magnetic flux.

24. Apparatus responsive to the power being transmitted by a rotating shaft comprising, in combination, a rotor assembly secured to rotate with said shaft, said rotor assembly comprising a pair of axially spaced torque rings secured to said shaft and a reference ring centrally disposed of said torque rings also secured to said shaft, axially directed projections on each side of said reference ring, axial projections on each of said torque rings disposed to interlock with the axial projections on the adjacent sides of said reference ring, said projections forming circumferential airgaps therebetween which are so arranged that the circumferential airgaps between the projections of one torque ring and the reference ring increase and the circumferential airgaps between the projections of the other torque ring and reference ring decrease upon the application of torque to said shaft, a stationary member of axial length corresponding to the axial length of said rotor assembly and having portions thereof disposed in proximity to said torque rings so that airgaps of constant magnetic characteristic are formed therebetween whether said rotor is rotating or stationary, a toothed rotor magnetically connected with said reference ring, a stator for said toothed rotor magnetically connected with said stationary member, a winding disposed on the stator, said stator and toothed rotor forming airgaps therebetween of higher magnetic reluctance than the reluctance values of said circumferential airgaps at zero shaft torque, and means for producing a magnetic flux in said stationary member and said rotor assembly.

25. Apparatus as set forth in claim 24 in which said means for producing a magnetic flux comprises at least one stationary annular winding disposed to encircle said rotor assembly.

26. Apparatus for indicating the power output of a rotating shaft comprising, in combination, a single stationary electromagnetic unit including a single electrical coil, and means responsive to the torque and speed characteristics of said shaft for inducing a voltage in said electrical coil indicative of the power output of said shaft.

27. Apparatus for measuring the peripheral displacement of first and second regions of a rotatable means from one another, said apparatus comprising a stationary flux carrying means of high magnetic permeability with respect to which the rotatable means has rotation, first and second means connected, respectively, with said first and second regions of the rotatable means so as to rotate therewith and having portions of relatively high magnetic permeability with a spacing between them of relatively high reluctance varying in accordance with change in peripheral displacement of the first and second regions of the rotatable means, means for causing magnetic flux to flow in the stationary flux-carrying means and the said portions of high magnetic permeability, and means responsive to the magnetic flux for indicating the effect of the spacing of the said portions of high magnetic permeability upon the magnetic flux as a measure of the peripheral displacement of the first and second regions of the rotatable means.

FRANK W. GODSEY, Jr.

REFERENCES CITED

The following references are of record in the file of this patent:

UNITED STATES PATENTS

| Number | Name | Date |
| --- | --- | --- |
| 891,018 | Vawter | June 16, 1908 |
| 979,503 | Johnson | Dec. 27, 1910 |
| 2,173,039 | Muir | Sept. 12, 1939 |
| 2,256,406 | Muir | Sept. 16, 1941 |
| 2,260,036 | Kuehni | Oct. 21, 1941 |
| 2,329,121 | Lamberger et al. | Sept. 7, 1943 |
| 2,365,073 | Haight | Dec. 12, 1944 |
| 2,367,017 | Gardiner | Jan. 9, 1945 |
| 2,385,005 | Langer | Sept. 18, 1945 |

FOREIGN PATENTS

| Number | Country | Date |
| --- | --- | --- |
| 4,669 | Great Britain | 1910 |
| 215,986 | Great Britain | May 22, 1924 |
| 442,441 | Great Britain | Feb. 3, 1936 |
| 527,835 | France | Aug. 3, 1921 |
| 554,276 | Germany | July 7, 1932 |
| 659,658 | France | Feb. 5, 1929 |

OTHER REFERENCES

An article entitled "Aircraft-Engine Torque Instruments" by F. W. Godsey and B. F. Langer on pages 686 to 690 of volume 63 of Electrical Engineering, Sept. 1944, a magazine published by American Institute of Electrical Engineers, 33 West 39th St., New York 18, N. Y.